(12) United States Patent
Chee et al.

(10) Patent No.: US 8,774,974 B2
(45) Date of Patent: Jul. 8, 2014

(54) REAL-TIME PHOTOVOLTAIC POWER PLANT CONTROL SYSTEM

(75) Inventors: Simon Chee, Toledo, OH (US); John Bellacicco, Stamford, CT (US); Harry Sawyer, Scottsdale, AZ (US); Mahesh Morjaria, Marietta, GA (US)

(73) Assignee: First Solar, Inc., Perrysburg, OH (US)

( * ) Notice: Subject to any disclaimer, the term of this patent is extended or adjusted under 35 U.S.C. 154(b) by 425 days.

(21) Appl. No.: 13/183,685

(22) Filed: Jul. 15, 2011

(65) Prior Publication Data
US 2013/0018516 A1    Jan. 17, 2013

(51) Int. Cl.
| | |
|---|---|
| G05D 3/12 | (2006.01) |
| G05D 5/00 | (2006.01) |
| G05D 9/00 | (2006.01) |
| G05D 17/00 | (2006.01) |

(52) U.S. Cl.
USPC ........... 700/287; 700/286; 700/295; 700/297; 60/641.8; 60/641.15

(58) Field of Classification Search
USPC ........ 700/286–287, 291, 295, 297; 136/206; 323/906; 60/641.8, 641.15
See application file for complete search history.

(56) References Cited

U.S. PATENT DOCUMENTS

| | | | | |
|---|---|---|---|---|
| 6,311,137 | B1 * | 10/2001 | Kurokami et al. | 702/60 |
| 7,772,716 | B2 * | 8/2010 | Shaver et al. | 307/31 |
| 7,929,324 | B1 * | 4/2011 | Kernahan et al. | 363/65 |
| 8,076,802 | B2 * | 12/2011 | Fornage | 307/151 |
| 8,249,758 | B2 * | 8/2012 | Schugart et al. | 700/298 |
| 8,264,195 | B2 * | 9/2012 | Takehara et al. | 320/101 |
| 8,452,461 | B2 * | 5/2013 | Sawyer et al. | 700/291 |
| 8,581,441 | B2 * | 11/2013 | Rotzoll et al. | 307/82 |
| 2007/0252716 | A1 * | 11/2007 | Burger | 340/635 |
| 2009/0000654 | A1 | 1/2009 | Rotzoll et al. | |
| 2009/0200994 | A1 | 8/2009 | Fornage | |
| 2009/0283129 | A1 * | 11/2009 | Foss | 136/244 |
| 2010/0067271 | A1 * | 3/2010 | Garces et al. | 363/95 |
| 2010/0138063 | A1 | 6/2010 | Cardinal et al. | |
| 2011/0012430 | A1 * | 1/2011 | Cheng et al. | 307/82 |
| 2011/0221269 | A1 * | 9/2011 | Borger et al. | 307/26 |
| 2011/0264289 | A1 * | 10/2011 | Sawyer et al. | 700/287 |
| 2012/0043818 | A1 * | 2/2012 | Stratakos et al. | 307/77 |
| 2013/0234523 | A1 * | 9/2013 | Anichkov et al. | 307/82 |
| 2013/0245846 | A1 * | 9/2013 | Bellacicco et al. | 700/287 |

FOREIGN PATENT DOCUMENTS

WO    WO 2008/138288 A1    11/2008

* cited by examiner

*Primary Examiner* — Ramesh Patel
(74) *Attorney, Agent, or Firm* — Dickstein Shapiro LLP

(57) ABSTRACT

A real-time photovoltaic power plant control system and method of control for plant output, voltage regulation and/or power factor regulation. The system comprises a grid interface controller configured to receive power information from a power grid and provide commands for controlling at least one active or reactive power supplied to the power grid, a power plant controller configured to receive commands from the grid interface controller for and direct real-time output of the power plant, a plurality of local controllers connected to and controlled by the power plant controller, and a plurality of inverters each connected to supply power from at least one photovoltaic device to the power grid and arranged such that each local controller is connected to and controls at least one inverter, the inverters reporting status information in real-time back to the local controllers, and the local controller reporting status information in real-time back to the power plant controller.

37 Claims, 6 Drawing Sheets

US 8,774,974 B2

REAL-TIME PHOTOVOLTAIC POWER PLANT CONTROL SYSTEM

FIELD OF THE INVENTION

Embodiments of the invention relate to photovoltaic power plant control systems; specifically real-time control systems that manage utility scale photovoltaic plants.

BACKGROUND OF THE INVENTION

A utility scale photovoltaic plant contains tens to hundreds of independently operating inverters that convert photovoltaic-generated DC energy into AC for feeding the electric grid. Until now, the inverters provide the local control for power factor and/or voltage regulation and the plants lack a centralized control system that is capable of providing dynamic voltage or power factor regulation at the plants point of common coupling or point of intersection to the electric grid.

As the utility scale plants continue to increase both in size and population, simple inverter level voltage and power factor regulation is no longer sufficient. More sophisticated photovoltaic plant control systems are needed that provide centralized voltage and power factor regulation.

In addition, the utility scale plants are not always populated with same-type or same-operating characteristic inverters, generally all from a single manufacturer, the systems must be capable to operate with different equipment supplied by different manufacturers.

Also, the control systems must be capable of lowering the real power output of the plant if required to accommodate effective and reliable electric grid operation.

DETAILED DESCRIPTION OF THE INVENTION

In the following detailed description, reference is made to the accompanying drawings which form a part hereof, and which illustrate specific embodiments of the invention. These embodiments are described in sufficient detail to enable those of ordinary skill in the art to make and use them. It is also understood that structural, logical, or procedural changes may be made to the specific embodiments disclosed herein without departing from the spirit or scope of the invention.

Described herein is a real-time photovoltaic power plant control system adapted for use with utility scale plants. The system controls in real-time the output of connected inverters in a manner so that the plant performs as a single entity and required conditions at a point of grid intersection can be met.

In one embodiment, the control system comprises a power plant controller, an associated grid interface controller which command operation of the power plant controller, and a plurality of local controllers connected to and controlled by the power plant controller, each local controller being connected to and controlling at least one inverter. The power plant controller is also arranged to control inverters having different operating characteristics. The inverters can also be directly controlled by the power plant controller, in which case local controllers are omitted (since inverters controllers are directly utilized instead).

Figure 1:
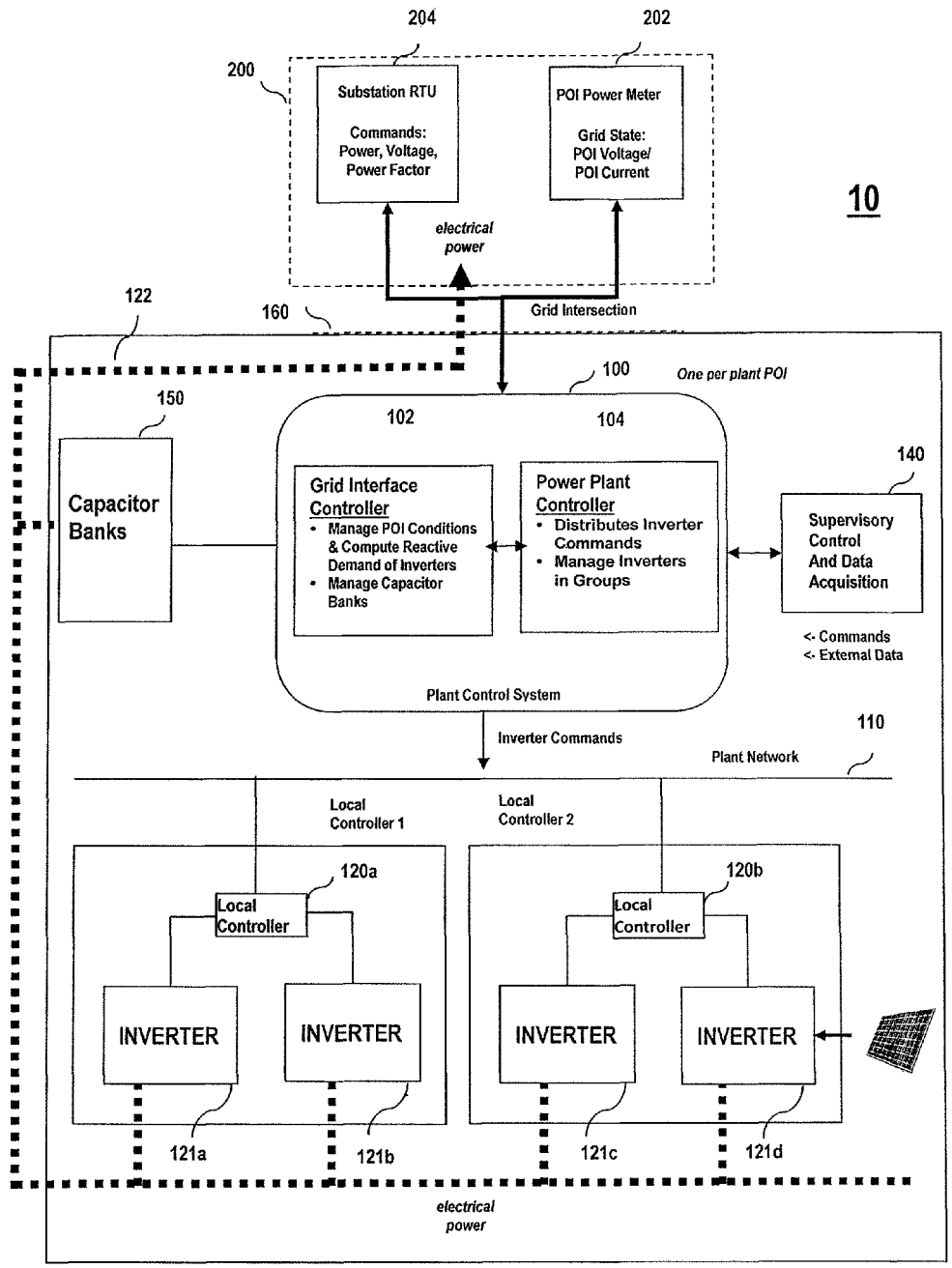
FIG. 1 illustrates data and message flow between components of a photovoltaic power plant control system according to an embodiment described herein.

FIG. 1 illustrates such a plant control system 100 and its interfaces to other devices in a plant 10. Specifically, plant control system 100, which includes grid interface controller 102 and power plant controller 104, is connected via a plant network 110 to a plurality of local controllers 120a-n (120a, 120b are shown), which are each connected to one or more inverters 121a-n (121a, 121b and 121c are shown). Local controllers 120a-n are generally power control system programmable logic controllers which can be individual computing devices each having a processor and a memory. Inverters 121a-n may be controlled directly by the power plant controller 104, but to reduce overall load on the power plant controller 104, use of local controllers 120a-n is desirable.

There can be anywhere from tens to hundreds (or more) of inverters 121 in power plant 10. Plant control system 100 provides inverter commands to each inverter 121a-n via the plant network 110, which can provide communication functions. More specifically, the output of inverters 121a-n are provided on a power path 122 to a grid 200. A capacitor bank 150 which can also be connected in the power path 122 provides reactive power support. A supervisory control and data acquisition system 140 provides set points to the plant control system 100.

Power plant 10 is connected to power grid 200 at a point of intersection 160. Elements of the plant control system 100 can receive information and commands from a point of intersection power meter 202, which provides measurement of point of intersection voltage and current, and a substation real-time uplink 204, which can provide set point commands from the grid 200 for power, voltage, power factor, or the like. The power outputs of inverters 121a-n are connected to the grid intersection 160.

The plant control system 100 is designed to control the real power output of the solar plant when required so that it does not exceed a given limit, and provide dynamic voltage and/or power factor regulation of the power plant 10 at the point of intersection 160. The plant control system 100 implements plant level logic and closed loop control schemes to provide fast and reliable output level control. It utilizes real-time commands to inverters 121a-n to achieve these functions.

Generally, there is one plant control system 100 per power plant 10. As noted above, the plant control system 100 provides a supervisory control and data acquisition system 140 for the purpose of local configuration and troubleshooting of the system 100. The supervisory control and data acquisition system 140 is typically used during normal operations. Commands to the plant control system 100 can be provided either from a local operator through the supervisory control and data acquisition system 140, or directly from the power grid through grid interface equipment such as substation real-time uplink 204.

As shown in FIG. 1, the plant control system 100 has two major components: grid interface controller 102 and power plant controller 104. The grid interface controller 102 monitors system level measurements obtained at the grid interface 200 from, e.g., point of intersection power meter 202 and computes a plant Mega Volt Ampere Reactive (MVAR) target for power plant 10. It also accepts an active power adjustment command from the operator through interface 140 and, in that case, adjusts the active plant power output (i.e., by determining a Mega Watt (MW) output level) to meet this target. It can also receive commands from the grid 200 through substation real-time uplink 204. It should be noted that the grid interface controller 102 and power plant controller 104 can each be individual computing devices having a processor and a memory.

The grid interface controller 102 is capable of communicating the plant MVAR target to the power plant controller 104, which is capable of determining inverter MVAR targets for the inverters 121a-n connected to each local controller 120a-n. The grid interface controller 102 communicates the plant MVAR target to the power plant controller 104, which in turn then commands, via plant network 110 and local controllers 120a-n, the inverters 121a-n to desired operational settings to reach the plant MVAR target. Each inverter 121a-n, which may have a ramp rate limit, will accept the inverter level MVAR target and will ramp up (or down) to the directed output level, as permitted by its ramp rate limit.

Grid interface controller 102 can interface to point of intersection power meter 202 to obtain point of intersection conditions, typically current and voltage, at the point of intersection 160. The current and voltage data is used for closed loop feedback control of the power plant 10. Grid interface controller 102 can also interface to the substation real-time uplink 204 using standard substation equipment interface protocols, to obtain commands from the grid 200. The purpose of this uplink 204 is to provide the flexibility to grid operators or others to directly provide voltage, power factor and/or power set points from a remote location to the grid interface controller 102.

The power plant controller 104 has the key responsibility of managing all the inverters in the plant. It accepts desired MVAR needed targets from the grid interface controller 102 and determines its distribution to the inverters 121a-n. It also accepts maximum desired active power output (MW) targets from the grid interface controller 102. For example, if the plant output is commanded to 80% of maximum, it determines active power targets for inverters 121a-n and sends those MW targets to the inverters 121a-n for implementation, typically via an active power adjustment command. Since each of the inverters 121a-n can only be reduced to a certain specified level and not any lower, the power plant controller 104 can manage dynamic stopping and starting of inverters 121a-n as necessary. Finally, power plant controller 104 can aggregate status information from all the inverters 121a-n and provide that aggregated data to the grid interface controller 102.

Figure 2:
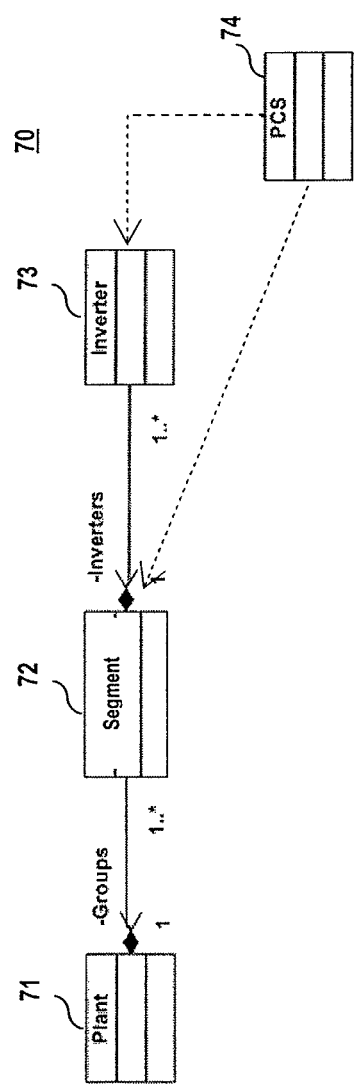
FIG. 2 illustrates an exemplary object model for the FIG. 1 system.

Each local controller 120a-n is connected to at least one and typically two or more inverters 121a-n (e.g., local controller 120a and inverters 121b, 121c in FIG. 2). The local controllers 120a-n are used for communication with the inverters 121a-n. In a system without local controllers 120a-n, inverter 121a-n can have a direct interface to plant network 110.

FIG. 2 below illustrates an object model 70 that can be housed in the memory of power plant controller 104 to implement the above-described real-time plant control methodology. A plant object 71 is the top level object that models the physical PV power plant 10. The plant object 71 consists of one or more segment objects 72 to represent a collection of inverters 121a-n that share the same characteristics (and their associated local controllers 120a-n). A segment object 72 is modeled as containing one or more inverter objects 73. A local controller object 74 contains one or more inverter 121a-n objects. Different inverters having different operating characteristics will have objects in different segment objects 72. In this way the plant object 71 is able to model and control different inverters having different operating characteristics. Thus, power plant controller 104 is able to control various inverters 121a-n having different operational characteristic through different segment objects 72.

Figure 3:
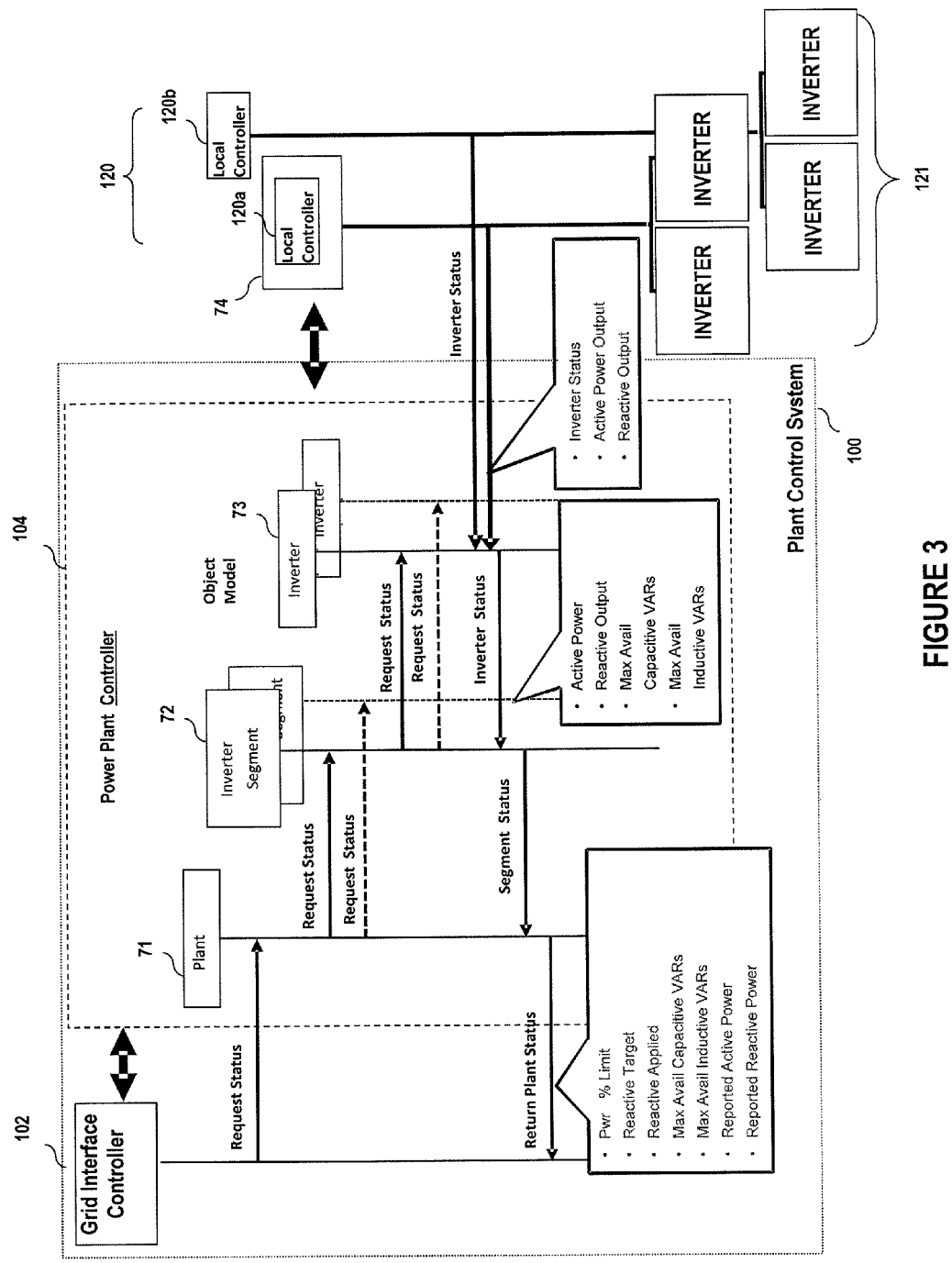
FIG. 3 illustrates communications between the grid interface controller (GIC) and power plant controller (PPC) including the objects modeled in the PPC; as well communications with other components of the FIG. 1 system.

FIG. 3 illustrates the data and message flow between components of the power plant 10. In this illustration, the grid interface controller 102 initiates a request status call (or message) to the power plant controller 104. Internally within the power plant controller 104, this call is received by the plant object 71 and handled. Plant object 71 in turn calls each of its Segment objects 72 to handle the message at that level. Segment objects 72 in turn make a call to each configured inverter object 73 to handle the message at that level.

It is assumed that a plant may generally contain inverters 121a-n that do not have the same operational characteristics e.g., they may be from different manufacturers. Also, each set of inverters 121a-n may be configured differently to achieve improve performance. For that reason, segments 72 of inverters 121a-n can also represent a collection of same characteristic inverters 121a-n that are to be configured similarly. This segmentation concept provides considerable flexibility in controlling inverters 121a-n with differing operating characteristics or differing performance needs with minimal additional complexity.

The organization of the power plant 10 into segments 72 also permits power plant controller 104 to select one segment 72 to emphasize reactive power output and another to emphasize active power output, based on, for instance, weather, location or performance characteristics which can be received via supervisory control and data acquisition system 140. The data itself may be obtained from external sources, e.g., via interne-obtained weather data on supervisory control and data acquisition system 140. In one example, using live cloud cover data obtained from supervisory control and data acquisition system 140, segments 72 corresponding to inverters 121a-n having solar panels determined to be under cloud cover can be managed by the power plant controller 104 to maximize reactive power output. This determination need not necessarily be weather data driven; cloud cover is also observable by monitoring fluctuations in the output of an inverter 121a-n. In one example, inverters 121a-n with solar panels under cloud cover (observed, e.g., by reduced output) are managed by the power plant controller 104 to maximize reactive power output over active power output, since cloud cover tends to undermine predictability of power output.

Generally, a call is made to each local controller object 74 to get the actual status of the operating inverter 121a-n. The local controller object 74 forwards the status data from the operating inverter 121a-n to a corresponding inverter object 73. Once each of the inverter objects 73 has received the latest status data (e.g., active power output and reactive power output of an inverter 121a-n), it calculates items such as maximum available capacitive and inductive VARs. Then the information flows back to the segment group 72 level where it is appropriately aggregated for each segment. The segment level data is then passed on back to the plant object 71 level which aggregates it to provide plant level data. The plant object 71 packages the required data and sends a message to the grid interface controller 102. The real-time aggregation of status information permits grid interface controller 102 and power plant controller 104 to manage both the plant and inverter MVAR targets with accuracy.

Status information obtained from each inverter 121*a-n* comprises at least inverter status (i.e., whether the inverter 121*a-n* is in a standalone mode or under plant control system 100 control), active power output (in MW) and reactive power output (in MVAR). The inverter 121*a-n* status information can also include estimates of maximum available capacitive Volt Ampere Reactives (VARs) and maximum available inductive VARs, as calculated by a connected local controller 120*a-n*. The power plant controller 104 aggregates the received status information and in turn reports this status information to the grid interface controller 102, which can include one or more of the power plant 10's: present active power percent limit, present reactive power target (in MVAR, the last requested MVAR target), reactive power applied (in MVAR, the present MVAR value applied to all inverters), maximum available capacitive VARs, maximum available inductive VARs; reported active power output (aggregated current MW output of all inverters); and reported reactive status (aggregated current. MVAR output of all inverters).

In general, output capability available from each inverter 121*a-n* is dependent upon the operating characteristics of the inverter 121*a-n*. The maximum available capacitive and inductive VARs for each inverter 121*a-n* can be calculated in real-time based on the inverter 121*a-n* operating characteristics and prevailing conditions. This information can be aggregated for each segment 72 and the whole power plant 10 and provided to the power plant controller 102.

Both grid interface controller 102 and power plant controller 104 will also interface to the supervisory control and data acquisition system 140 to (a) provide data to the supervisory control and data acquisition system 140 and (b) to accept plant controller commands from the supervisory control and data acquisition system 140. The data provided to the supervisory control and data acquisition system 140 can include alarms, status, metering, operating modes and set points monitoring. The supervisory control and data acquisition system 140 is also capable of providing visualization of the complete plant controller capability including visibility of the power plant model 70. It can also control the power plant controller 104 to execute normal operational start up and shut down of the controller 104, command local controllers 120*a-n* and inverters 121*a-n* into service and out of service, and adjust MVAR targets for output of the entire power plant 10.

Figure 4:
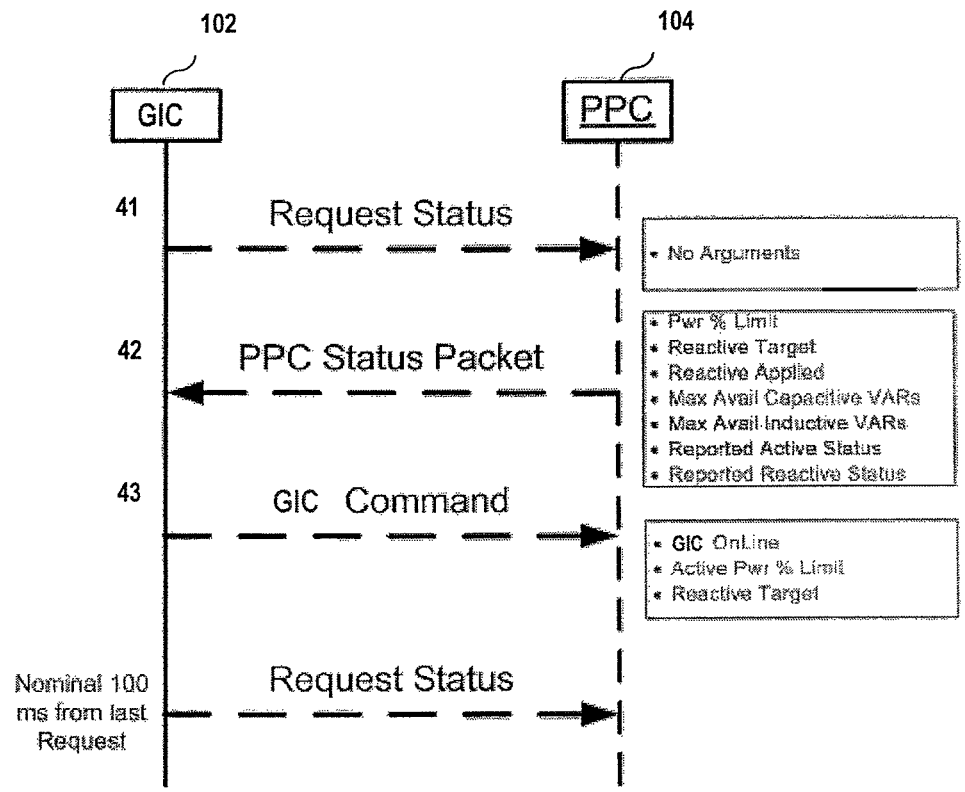
FIG. 4 shows an information exchange between the grid interface controller (GIC) and power plant controller (PPC).

FIG. 4 shows one example of an information exchange between the grid interface controller 102 and the power plant controller 104. Action is initiated by a command request from the grid interface controller 102 for status from the power plant controller 104 (step 41). The power plant controller 104 responds with present status information, as described above, including a plurality of data points such as active power percent limit, current reactive power target and current reactive power applied (step 42). The grid interface controller 102 uses that status information to formulate a next request and sends that request to the power plant controller 104 for action (step 43). The command request in step 43 can include, as will be discussed in more detail below, a control request (which tells power plant controller to accept grid interface controller 102 control, or operate in stand alone mode), an active power percent limit (requesting that the power plant controller 104 limit output of the power plant 10 to a percent of total capacity), and/or a reactive power target (requesting that the power plant controller 104 cause the power plant 10 to output at a certain MVAR level).

As an illustrative example, if the grid interface controller 102 needs to be powered off (e.g., to perform a firmware update), the grid interface controller 102 informs power plant controller 104 via an GCI command (step 43 in FIG. 4) that it should switch to a stand alone mode where, for example, power plant controller 104 instruct the inverters 121*a-n* to hold a fixed power factor. Once standalone mode is enabled, the grid interface controller 102 can be safely turned off, updated and restarted. Grid interface controller 102 can resume control of the plant by sending a control request. If power plant controller 104 is in standalone mode, it will monitor commands for a power plant controller control flag, which will be used by the power plant controller 104 to decide if the rest of the contents of the message should be implemented (power plant controller control flag present) or ignored.

If the operator wished to impose an active power adjustment on the plant control system 100, the operator can define a specific power output level in the supervisory control and data acquisition system 140 to enable power adjustment. Based on information received from the supervisory control and data acquisition system 140, the grid interface controller 102 will monitor power plant 10's active power production and run an incremental closed-loop control algorithm (see, e.g., FIG. 6) on the active power output to ensure that it does not exceed the desired setting.

Additional examples of the operation of the FIG. 1 system will now be described. Consider a plant rated for 290 MW of power output to the grid but producing 240 MW, where the operator further requests plant output be limited to 200 MW. Since the output is below the plant rating of 290 MW it is clear that some photovoltaic solar panels are outputting less than 100% rated power and others may or may not be outputting rated power. The grid interface controller 102 can reduce the active power percent limit from 100% to, say 99% and monitor the system output. The data collected from this incremental change provides power plant controller 104 with a current state of power plant 10. To implement the incremental change, inverters 121*a-n* can be told, via active power adjustment commands from power plant controller 104, to limit their total production to a percentage of rated capacity. Thus, if any inverters 121*a-n* are at full production, they will limit their production to 99% of rated capacity. If any inverters 121*a-n* are putting out less than 99% of rated, they will continue to operate as before. If the plant is still putting out more than 200 MW, the grid interface controller 102 will reduce the active power percent limit further. Eventually enough of the inverters will be limited in output so as to reduce the system output to 200 MW. As conditions vary (e.g., cloud cover changes, time of day, etc.) the grid interface controller 102 will continue to monitor power plant 10 output. If power production falls below the 200 MW output, the grid interface controller 102 will slowly increase the active power percent limit to try to again achieve a 200 MW output. If the conditions are such that the power plant 10 is incapable of reaching 200 MW output then the grid interface controller 102 will eventually return to requesting 100%, that is, requesting all inverters 121*a-n* to run at their maximum capabilities. Generally, the control loop setting active power percent limit will operate relatively slowly (several seconds to minutes) to avoid rapid fluctuations in output.

An inverter 121*a-n* may have its own ramp rate limit on active power production. Grid interface controller 102 and power plant controller 104 must account for this and the active power targets must be chosen for the inverter 121*a-n* to match this additional constraint. For example, suppose the power plant controller 104 is imposing a limit of 50% of rated power but there is an inverter 121*a-n* that is currently being operated in stand alone mode, i.e., not under the control of the grid interface controller 102 and power plant controller 104.

Further suppose that inverter 121*a-n* is putting out 100% rated output. Now consider if that inverter is told to start following the power plant controller 104 controls. It will immediately see that its active power output is 100% but the power plant controller 104 is requesting 50%. If the inverter 121*a-n* has a ramp rate limit, the inverter 121*a-n* will not just suddenly drop its output; instead, the inverter 121*a-n* will ramp its output down at that rate until it matches the value requested by the grid interface controller 102.

Figure 6:
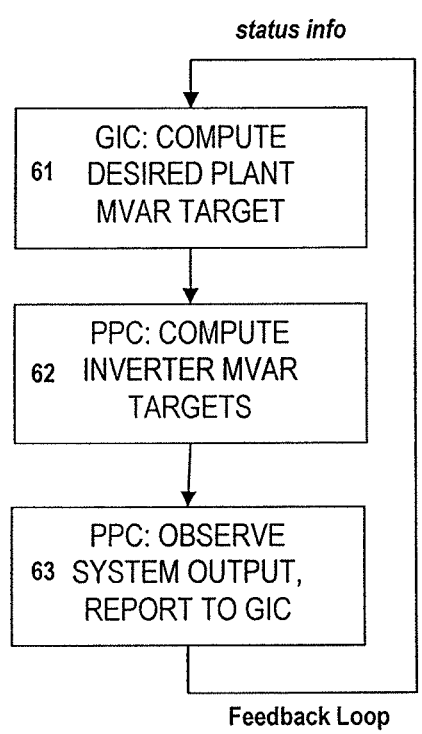
FIG. 6 illustrates an exemplary feedback loop between the smart grid interface and power plant controller.

The grid interface controller 102 can also send the power plant controller 104 a desired plant MVAR target based upon the present output that the power plant controller 104 believes inverters 121*a-n* are outputting, based on the status information aggregated by power plant controller 104. FIG. 6 illustrates such an exchange. Consider a plant with three solar inverters 121*a*, 121*b*, and 121*c* (i.e., as depicted in FIG. 1) each capable of producing 1.0 MVAR. If grid interface controller 102 determined that it required 0.9 MVAR to meet a requested voltage target, it would send this value as a plant MVAR target to power plant controller 104 (step 61). Generally, power plant controller 104 would divide this request evenly across the inverters 121*a*, 121*b*, and 121*c* such that each is putting out 0.3 MVAR (step 62).

Now consider the case of lost communication with one of the inverters 121*a-n* a, to the power plant controller 104. This can be due to one of two general reasons, (a) inverter 121*a-n* a has faulted offline and is no longer functioning, or (b) the communication link (via plant network 110) is broken but inverter 121*a-n* is functioning properly. In either case, there will be a lag in time between when this happens and when the power plant controller 104 notices this unit is no longer communicating.

In case (a), inverter 121*a* has faulted offline and is no longer functioning. Actual system output will drop from 0.9 MVAR to 0.6 MVAR even though the power plant controller 104 still believes it is generating 0.9 MVAR (step 63). Grid interface controller 102 will observe the drop as reflected in output voltage at the grid interconnect 106 and, as a result, request a higher MVAR target output from power plant controller 104 to compensate. Grid interface controller 102 will increase its requested output by this missing amount and go to, e.g., ~1.2 MVAR. Because power plant controller 104 still thinks it has three inverters 121*a*, 121*b* and 121*c* to work with, each will be sent a command of 0.4 MVAR. Since inverter 121*a-n* a has faulted, only 121*b* and 121*c* output, resulting in generation of 0.8 MVAR. Grid interface controller 102 will continue to see lower than desired output voltage at the grid interconnect 106 and will raise the command further to, say, ~1.35 MVAR at which point the power plant controller 104 will request 0.45 MVAR from each inverter 121*a-c* and actual output will be return to 0.9 MVAR.

While this is happening it is assumed the power plant controller 104 has not identified the loss of inverter 121*a* so it still reports that it is putting out the full ~1.35 MVAR. The grid interface controller 102 computes that it needs no additional MVAR output so it continues to echo back the 1.35 MVAR target to the power plant controller 104 as the next request. Eventually, however, power plant controller 104 can determine that inverter 121*a* has faulted, because, e.g., it will not be receiving up to date status information from the inverters 121*a-n*. Once power plant controller 104 determines inverter 121*a* has faulted, power plant controller 104 will report to grid interface controller 102 that it is only getting output from two of the three inverters—that is, reported output from power plant controller 104 will suddenly drop from 1.35 MVAR to 0.90 MVAR. However, grid interface controller 102 will have already computed that power plant 10 output is at the proper level and no additional changes are required so it will also simultaneously echo back the next request to stay at 0.90 MVAR. The power plant controller 104 will see this is what it is currently doing so no change will occur. Thus sudden detection of a loss of an inverter appears to result in a step change in reactive target power but in actuality this precisely compensates for a detected inverter loss which results in no unintended rise in the actual system output. There can, of course, be a momentary rise in output voltage when the inverter initially trips off but that cannot be avoided.

In case (b), a communication link (i.e. via plant network 110) is broken but inverter 121*a* is functioning properly and grid interface controller 102 is requesting the same output, as above, 0.9 MVAR. In this case, when inverter 121*a* initially fails to communicate, the power plant controller 104 does not yet recognize this so it reports its output at 0.90 MVAR and the grid interface controller 102 sees that the target is achieved so it simply sends back this value (0.90 MVAR) as the next target. At some point the power plant controller 104 will detect that inverter 121*a* is no longer communicating (because, e.g., it will not be receiving up to date status information) and at that point power plant controller 104 must determine whether inverter 121*a* is still online or not. For consistency reasons, power plant controller 104 must assume inverter 121*a* is lost and change the current "Reactive Applied" value from 0.90 MVAR (on 3 units) to 0.60 MVAR (on 2 units). Once power plant controller 104 reports this change back to the grid interface controller 102, grid interface controller 102 can change the plant MVAR request to the same value of 0.60 MVAR accounting for the fact that the power plant 10 is producing 0.30 MVAR more than reported. Note that a similar methodology can be applied if there are inverters 121*a-n* that are operating in a stand alone mode, since control would proceed similarly.

It is assumed that after each time the power plant controller 104 receives a request for status from the grid interface controller 102, it will reply with a status response as quickly as possible. If the grid interface controller 102 fails to hear a status reply it will internally freeze its output at the last value and resend this command to the power plant controller 104. After a certain number of consecutive command cycles without receiving a valid status message from the power plant controller 104, the grid interface controller 102 can declare an internal communication error to the operator (via supervisory control and data acquisition system). This will indicate to the operator that central control may have been lost. At that point, the grid interface controller 102 will continue to instruct the power plant controller 104 to operate in standalone mode. Grid interface controller 102, however, can remain online and provide some regulation of power plant 10 output by controlling the capacitor banks 150.

In order for the grid interface controller 102 to know how much it should adjust the active power percent limit at power plant controller 104 it is necessary for it to know the present active power targets that the power plant controller 104 is using. It is for this reason that the status reply message from the power plant controller 104 can contain an echo of the last command that it heard from the grid interface controller 102. This is only done as a consistency check to make sure everything is operating as expected since it is important that the grid interface controller 102 report any problems with setting an active power percent limit, especially if it detects that the power plant controller 104 is limiting power when it should not be.

It is also recognized that the power plant controller 104 may or may not be able to immediately ramp up the inverters 121*a-n* to the total MVAR requested by the grid interface controller 102. Consider the case that the power plant controller 104 is using TCP/IP point-to-point communication to the inverters 121a-n, and compound that with there being several hundred such inverters 121a-n in a large power plant 10. In that case, the power plant controller 104 will naturally require some time to communicate the new demand to all the inverters 121a-n. In principle this could take more than a single command cycle (assumed to be 100 ms) in which case the present MVAR target level the power plant controller 104 is trying, to achieve is actually different from the present actual power output command that it has sent out. This is one reason a reactive target is maintained as a data point to represent an unambiguous value of the targeted output the power plant controller 104 is attempting to command, even if it is unable to transmit that demand quickly to all the inverters 121a-n.

As stated above, the power plant controller 104 may require some time to communicate a given MVAR change request to the solar inverters 121a-n based upon the limitations in the plant network 110 between the power plant controller 104 and all the inverters 121a-n. In that case, at any given time, the power plant controller 104 may maintain two numbers, a reactive target it is attempting to achieve and a current value it believes is the present output (reactive power applied). Consider the case of 200 inverters 121a-n and a request to increase the MVAR output by 20 MVAR. Also assume that the power plant controller 104 can only communicate with 1 solar inverter 121a-n every millisecond. Thus, after 100 milliseconds it will only have been able to send an active power adjustment command to half of the solar inverters 121a-n. Thus, assuming that those inverters 121a-n are relatively fast in implementing that request, the power plant controller 104 knows that at this time its target is to increase by 20 MVAR but it has only been able to distribute this to half the system so the actual increase is only 10 MVAR. The two maintained figures (reactive target and reactive applied) allow the power plant controller 104 to report both of these quantities respectively to the grid interface controller 102. It is also possible to use only a single data point for output if power plant controller 104 is configured to broadcast a common MVAR target to all inverters 121a-n rapidly enough that the delay in receipt is inconsequential and the difference between reactive target and reactive applied minimal.

Further, the power plant controller 104 can also maintain separate figures for reactive applied and actual reported status from all the inverters 121a-n, due to inherent delay in receiving status updates from inverters 121a-n. This can serve as a consistency check, since the power plant controller 104 can also report to the grid interface controller 102 the total outputs of all responding inverters 121a-n.

To prevent the grid interface controller 102 from incurring integral wind-up, where a large change in an output target occurs and system accumulates a significant error while it is raising output to that level thus overshooting and continuing to increase as the accumulated error is unwound, it is necessary for it to know when inverters 121a-n have reached a maximum available production. To this end, the power plant controller 104 can also report both the maximum available capacitive VARs and the maximum available inductive VARs available for the grid interface controller 102 to request. When the requested plant MVAR target reaches either of these two limits the grid interface controller 102 will internally truncate any further requests to prevent integral windup.

It should also be recognized that the figures for reactive applied and reported reactive status reflect the local MVAR output of the inverters 121a-n; that is, the output at the physical site of the inverters 121a-n. Grid interface controller 102 can know and properly account for the fact that this value is not expected to equal the measured VAR injection at the point of intersection because there are additional losses and reactive elements (cables, transformers, etc) between these two points. This error, whether it is fixed or variable, does not affect the control capabilities of the grid interface controller 102 because the power plant controller 104 can also report a reasonable guess as to the approximate cumulative output at the local inverters 121a-n.

Figure 5:
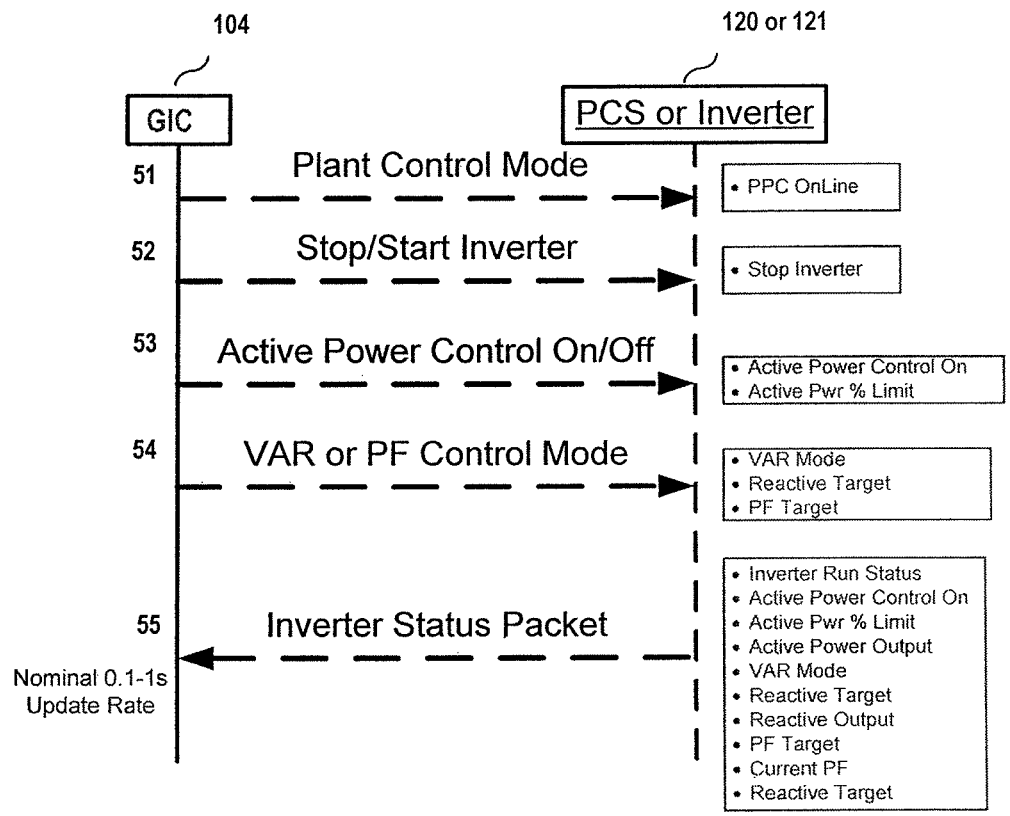
FIG. 5 shows an information exchange between the power plant controller and a local controller (PCS or Inverter).

Next, the interface between the power plant controller 104 (power plant controller 104) and an inverter 121a-n over the plant network 110 is described in greater detail. As mentioned above, although there can be a direct connection between the power plant controller 103 and the inverters 121a-n, there is usually no direct link between the power plant controller 104 and the inverters 121a-n. Commands can be routed through an appropriate local controller 120a-n. This information exchange is shown in FIG. 5. The control interface allows setting the inverter 121a-n in power plant controller mode, regulating the real and reactive power output of the inverter 121a-n, and shutting off/starting the inverter 121a-n as needed, especially for active power adjustment.

An inverter 121a-n is expected to either work in standalone mode or under the control of power plant controller 104. When an inverter 121a-n is in control mode, it will adhere to power plant controller 104's commands. Stand alone mode is generally configured to be a power factor control mode, that is, a mode in which the inverter 121a-n outputs reactive power that is consistent with achieving the configured power factor at the inverters terminal. In case of transition from control mode to stand alone mode, the inverter 121a-n can gradually move to new conditions, as expressed in the power plant controller 104's commands. So for example, if it was under an active power percent limitation and such limits are withdrawn, inverter 121a-n would gradually increase its active power output observing its own ramp rate limits. Mode transition can occur in case the power plant controller 104 commands the transition (by sending a control request, see step 51), communication with the power plant controller 104 is lost (no command received within a particular timeframe), or the power plant controller 104 is no longer functioning properly (e.g., detected improper command formatting).

The inverter 121a-n is also responsive to a stop inverter 121a-n command (step 52) which stops the inverter 121a-n from producing any power. This is done principally to meet a adjustment limit on the overall plant. The command is not be treated as an emergency stop but rather as a signal to reduce its power to zero and be on standby condition and to resume normal active power operation as soon as a command to resume power output is received. The inverter 121a-n may adhere to a ramp rate limit if so configured. The action to stop an inverter 121a-n will be exercised by the power plant controller 104 so as not to reduce the active power of the inverter 121a-n to a low level limit as operating at or below the low level limit may cause an adverse DC voltage situation in the inverter 121a-n.

An active power control command (step 53) sets the inverter 121a-n in a control mode. In the case when this mode is on, the inverter 121a-n will limit its maximum output to the given active power percent limit. The inverter 121a-n may adhere to a ramp rate limit, if so configured, to reach the output level. Note that no action is necessary if the inverter 121a-n is already producing less active power limit or the inverter 121a-n is already turned off for other reasons. When this mode is turned off, the inverter 121a-n will revert to standalone mode, i.e., normal operation without this constraint.

A power factor control command (step 54) sets the inverter 121a-n in VAR control mode or power factor control mode (generally the default). In VAR control mode, the inverter 121a-n is provided a target for reactive power production. The inverter 121a-n will produce that reactive power as long as it is capable of doing so and it is within its normal operating limits. In the power factor control mode, the inverter 121a-n is provided a target power factor.

Active power adjustment (when needed) is achieved by adjusting active power production of each inverter 121a-n and/or by turning on and off inverters 121a-n. Decreasing active power output in an inverter 121a-n potentially raises the effective DC/AC ratio and can lead to higher voltage conditions causing inverters 121a-n to trip off. So, for each inverter 121a-n type there is a limit to which its capacity can be reduced. For further reductions beyond a given low limit, it is better to turn off the inverter 121a-n until the reduction is no longer necessary. The overall strategy is to minimize the need to turn off inverters 121a-n as much as possible. So the first approach in adjustment is to lower power output of active inverters 121a-n. If that does not meet the targeted reduction, then the strategy is to determine how many inverters 121a-n should be turned off. The rest of the active inverters 121a-n would be adjusted back to at most their minimum setting. The power plant controller 104 must also take into account which inverters 121a-n are turned off so that when the adjustment is reduced or removed the inverters 121a-n can be restarted. It can also ensure that inverters 121a-n are turned off in ways that "off" duty is equally distributed to all the inverters 121a-n.

In sum, the plant control system 100 described herein is a significant advance and permits the construction of large scale photovoltaic plants agnostic of different equipment supplied by different manufacturers. By modeling plant 10 and its inverters 121a-n, and facilitating the transfer and aggregation of status information between the inverters 121a-n and plant control system 100, real-time control can be achieved with minimum complexity.

While several embodiments have been described in detail, it should be readily understood that the invention is not limited to the disclosed embodiments. Rather the embodiments can be modified to incorporate any number of variations, alterations, substitutions or equivalent arrangements not heretofore described. Although certain features have been described with some embodiments of the carrier, such features can be employed in other embodiments of the carrier as well. Accordingly, the invention is not limited by the foregoing description, but is only limited by the scope of the appended claims.

What is claimed as new and desired to be protected by Letters Patent of the United States is:

1. A real-time photovoltaic power plant control system, comprising:
a grid interface controller configured to receive power information from a power grid and provide commands for controlling at least one of active or reactive power supplied by a photovoltaic power plant to the power grid;
a power plant controller configured to receive commands from the grid interface controller and to direct, in real-time, active or reactive power output of the power plant;
a plurality of local controllers connected to and controlled by the power plant controller; and
a plurality of inverters each connected to supply power from at least one photovoltaic device to the power grid and arranged such that each local controller is connected to and controls at least one inverter, the inverters reporting status information in real-time back to the local controllers, and the local controller reporting status information, in real-time, back to the power plant controller;
wherein the grid interface controller is further configured to control a stored energy bank to supplement power output of the photovoltaic power plant.

2. The system of claim 1, wherein the at least one inverter connected to one of the plurality of local controllers has different operating characteristics than at least one inverter connected to another one of the plurality of local controllers.

3. The system of claim 1, wherein the grid interface controller is capable of monitoring power conditions at a connected power grid and determining a plant output target based on the power conditions monitored at the connected power grid.

4. The system of claim 3, wherein the grid interface controller determines the conditions from at least one of a point of intersection power meter providing point of intersection voltage and current.

5. The system of claim 3, wherein the grid interface controller is configured to receive commands from a communication device associated with the power grid.

6. The system of claim 1, wherein the grid interface controller is capable of receiving a target power to be supplied to said grid, and commanding the power plant controller to meet that target.

7. The system of claim 6, wherein the grid interface controller is capable of communicating the target power to the power plant controller which is capable of determining inverter output targets for the inverters connected to each local controller.

8. The system of claim 7, wherein the power plant controller is capable of distributing a target power command to the inverters connected to each local controller.

9. The system of claim 8, wherein the power plant controller is capable of starting and stopping one or more inverters connected to each local controller to achieve a target power.

10. The system of claim 1, further including an object model stored in a memory of the power plant controller containing status information received from the inverters.

11. The system of claim 1, wherein the grid interface controller is capable of operating capacitor banks to supplement power output of the photovoltaic power plant.

12. The system of claim 1, wherein the power plant controller is capable of aggregating status information from inverters connected to each local controller and providing the aggregated status information to the grid interface controller.

13. The system of claim 12, wherein the status information obtained from each inverter comprises at least one of inverter status, active power output and reactive power output.

14. The system of claim 12, wherein the status information obtained from each inverter further comprises at least one of maximum available capacitive output and maximum available inductive output.

15. The system of claim 12, wherein the grid interface controller uses the aggregated status information to determine if the power plant is capable of meeting a target power requested by the power grid.

16. The system of claim 1, wherein at least one local controller is connected to and controls a plurality of inverters and each local controller is capable of accepting an inverter output target from the power plant controller and distributing it to an appropriate inverter.

17. The system of claim 1, further including a supervisory control and data acquisition system connected to the power plant controller for providing at least output level commands to the power plant controller.

18. The system of claim 17, wherein the power plant controller manages power output from segments based on weather, location or performance characteristics of connected inverters.

19. The system of claim 18, wherein segments containing inverters connected to photovoltaic devices having reduced power output due to weather conditions are managed by the power plant controller to emphasize reactive power output.

20. The system of claim 1, wherein the plurality of local controllers and associated inverters are arranged in segments, and wherein the local controllers in each segment have connected inverters with similar operating characteristics.

21. The system of claim 20, wherein the power plant controller is capable of coordinating individual segment control to meet a desired target power output to the power grid.

22. The system of claim 20, wherein the power plant controller is capable of selecting a given segment to emphasize reactive power output to the connected power grid and another to emphasize active power output to the power grid.

23. The system of claim 10, wherein the object model comprises one or more segment objects, each associated with one or more inverter objects and representing a collection of inverters sharing the same operational characteristics.

24. The system of claim 7, wherein each inverter output target includes an active power percent limit to set inverter output at a percent of rated output.

25. A method for real-time control of a photovoltaic power plant comprising:
   receiving a photovoltaic power plant power output target;
   computing segment power output targets for a plurality of connected segments each comprising a plurality of inverters having similar operating characteristics; and
   distributing the segment power output targets to respective segments.

26. The method of claim 25, wherein the inverters in at least one of the segments have different operating characteristics than the inverters in another of the segments.

27. The method of claim 25, further comprising determining power output targets for the segments independently but coordinating a total output of the power plant to meet the plant output target.

28. The method of claim 25, wherein one segment is controlled to emphasize active power output while another is controlled to emphasize reactive power output.

29. The method of claim 28, wherein the segment controlled to emphasize reactive power output is selected because panels connected to inverters associated with that segment have reduced power output due to weather conditions or because the total power losses are reduced.

30. The method of claim 25, wherein the power output target is communicated from a grid interface controller to a power plant controller, the power plant controller computing the segment power output targets.

31. The method of claim 30, wherein the power plant controller provides its present status to the grid interface controller including one or more of the power plant's active power percent limit, reactive power target, reactive power applied, maximum available capacitive VARs, maximum available inductive VARs; reported active status; and reported reactive status.

32. The method of claim 30, wherein the power output target comprises an active power percent limit and a reactive power target.

33. The method of claim 30, wherein the power plant controller computes inverter power output targets for each of the inverters in each segment based on a respective segment power output target.

34. The method of claim 33, wherein the inverter power output targets are communicated to the inverters through local controllers.

35. The method of claim 33, further including adjusting the power output of the inverters based on the inverter power output targets.

36. The method of claim 33, wherein the inverters in each segment report back status information to the power plant controller including one or more of the inverter's active power percent limit, reactive power target, and reactive power output.

37. The method of claim 33, wherein the power plant controller issues control commands to the inverters directing the inverters to start, stop, or meet a desired target output.

* * * * *